United States Patent [19]

Liehr et al.

[11] Patent Number: 5,306,804
[45] Date of Patent: Apr. 26, 1994

[54] DISCONTINUOUS PROCESS FOR THE PRODUCTION OF A POLYAMIDE-6,6

[75] Inventors: Hartmut Liehr, Frankfurt am Main; Hans-Dieter Hofmann, Karben, both of Fed. Rep. of Germany

[73] Assignee: Zimmer Aktiengesellschaft, Frankfurt, Fed. Rep. of Germany

[21] Appl. No.: 126,035

[22] Filed: Sep. 23, 1993

[30] Foreign Application Priority Data

Apr. 26, 1993 [DE] Fed. Rep. of Germany ....... 4313587

[51] Int. Cl.$^5$ ............................................. C08G 69/28
[52] U.S. Cl. ..................................... 528/335; 528/324
[58] Field of Search ................................ 528/335, 324

[56] References Cited

U.S. PATENT DOCUMENTS

| | | |
|---|---|---|
| 2,163,636 | 6/1939 | Spanagel ............................. 528/335 |
| 3,193,535 | 7/1965 | Carter ................................. 528/335 |
| 3,501,441 | 3/1970 | Brignal ............................... 528/335 |
| 4,297,478 | 10/1981 | Rochina et al. .................... 528/335 |

*Primary Examiner*—Harold D. Anderson
*Attorney, Agent, or Firm*—Allegretti & Witcoff, Ltd.

[57] ABSTRACT

Discontinuous process for the production of polyamide-6,6 by heating an aqueous AH-salt solution, precondensing the solution with evaporation of water at 6 to 9 bar pressure and polycondensing in the melt phase, whereby the heating rate above 175° C. of the AH-salt solution is at least 1° C./minute, the rate of evaporation of water is at least 2%/minute (based on the quantity of water in the AH salt solution), the retention time for heating from 175° C. and precondensation is not more than 75 minutes and the total retention time including polycondensation is not more than 120 minutes.

3 Claims, No Drawings

5,306,804

DISCONTINUOUS PROCESS FOR THE PRODUCTION OF A POLYAMIDE-6,6

BACKGROUND OF THE INVENTION

The invention concerns a discontinuous process for the production of polyamide-6,6 comprising heating a 75% to 85% aqueous solution of adipic acid-hexamethylene diamine salt while raising the pressure, precondensing with evaporation of the water at constant pressure and polycondensing at a temperature in the range of 260° to 290° C. while reducing pressure to atmospheric pressure.

PRIOR ART

In producing polyamide-6,6 from adipic acid-hexamethylene diamine salt (AH-salt) which has long been known, the following difficulties arise. In order to make the starting monomers ready for reaction and to keep the reaction mixture at a low viscosity, water must be added to the AH salt. The reaction pressure must be high enough that the added water continues to be in the liquid state at reaction temperature. However, water prevents the formation of high molecular polyamides, making it necessary to remove the water completely prior to polycondensation. In particularly, the diamine component is volatile in steam. Extensive measures are therefore necessary to prevent pollution of the waste water and the air.

In addition to these difficulties the stoichiometric relationship is disturbed when a portion of the diamine component is carried away with the distilled water. This results in an interruption in the polycondensation reaction prior to the attainment of the desired high molecular weight. When these losses are offset by an initial surplus of diamine, triamines, for example dihexamethylene triamine, are produced in greater amounts. Triamines act as cross-linking agents, and therefore, adversely affect the polymer quality, particularly resulting in increased filament breakage and formation of knots in the spinning of the polyamide.

The prior art, in order to counteract these difficulties, precondenses the 70% to 85% AH salt solution at pressures of at least 16 to 19 bar and an ending temperature of 265° to 280° C., whereby the retention time for heating and precondensing is in excess of 200 min. and an additional retention time of approximately 90 to 135 minutes is required for the subsequent polycondensation (U.S. Pat. No. 2,163,636, DE-B 1 570 283, EP-B 0 000 142). This high process pressure requires relatively expensive equipment. In addition, the high precondensation temperatures and the very long retention times result in significant diamine losses and increased formation of triamines, with the attendant negative effects on the polyamide quality.

Another known method is to end the precondensation while retaining the high pressure at 240° to 245° C., in which case more than 100 minutes are necessary for the subsequent polycondensation. In this process (U.S. Pat. No. 3,407,179) the reactor walls are sprayed with AH salt solution, with the disadvantage that polyamide is contaminated by crosslinked polyamide from the prior batch. In the process of DE-A 2 117 623 which likewise operates at high pressure, volatile diamine is condensed on a dephlegmator spiral and returned into the reactor during heating and during the first ⅔ of the precondensation process. Nevertheless, 180 minutes plus heating time are necessary to achieve a polyamide solution viscosity of 2.23.

In continuously operated tube reactors process pressures of at maximum 10 bar are also known. The associated conditions of temperature and retention time, however, are not realizable in discontinuously operated autoclave vessels (EP-B 0 129 195 and 0 129 196).

Therefore there continues to be a need for a discontinuous process for the production of polyamide-6,6 which minimizes diamine losses and the formation to triamines, and employs lower pressure and therefore less expensive equipment than the processes known heretofore.

THE INVENTION

The object of this invention is to provide a discontinuous process for the production of polyamide-6,6 from an aqueous adipic acid-hexamethylene diamine salt solution which will make possible both the minimization of diamine losses and of the formation of triamines and the utilization of low-cost equipment.

The new process begins with 75% to 85% aqueous solutions of adipic acid and hexamethylene diamine, with dicarboxylic acid and diamine present in essentially equivalent amounts as neutral salt (AH salt). The preparation of these solutions is accomplished by known methods. Small quantities of other monomers, such as caprolactam, up to approximately 3% by weight, can be added in order to modify the characteristics of the polyamide.

The AH salt solution is first heated under autogenous pressure with the exclusion of oxygen and subsequently is precondensed while evaporating the water which was introduced with the solution and which was generated during the reaction. In accordance with the invention, the solution is heated above 175° C. at a rate of at least 1° C./min. until a pressure in the range of 6 to 9 bar is attained, preferably approximately 8 bar. The same heating rate is recommended between 165° and 175° C., whereas at temperatures below 165° C., the rate has no significant influence on the further process. Then the water is distilled off, while retaining the pressure, at a rate of evaporation of at least 2%/minute, preferably at least 3%/min., the percent being based on the quantity of water in the AH salt solution. With these heating and evaporation rates, the precondensation process including the time for heating above 175° C. is finished after a retention time of not more than 75 minutes.

After the water which was introduced with the AH salt solution and that which originated in the condensation reaction has been essentially distilled off, which occurs at a temperature of the reaction mass of not more than 255° C., polycondensation is carried out in known manner in the melt phase by slowly lowering the process pressure to 1 bar or less and simultaneously increasing the temperature to between 260° and 290° C. After a remarkably short polycondensation time, high molecular polyamide-6,6 corresponding to a relative viscosity of at least 2.2 dl/g measured at 25° C. in a 1% polyamide solution in 96% sulfuric acid is obtained. The total retention time, comprising heating above 175° C. precondensation and polycondensation, amounts to not more than 120 minutes, and this without the addition of a catalyst. The addition of usual catalysts, for example phosphorus compounds, is possible but is normally not necessary.

The polyamide-6,6 which is discharged from the reactor and granulated in the usual manner is wellsuited for the production of fibers, films and molded articles. Known additives such as delustering substances, dyes and stabilizers can be added to the reaction mixture at any time.

Surprisingly, we found that to realize a high volume-time yield, which primarily determines the cost effectiveness of the process, a high reaction rate in the precondensation due to high temperatures in combination with high pressure is less important than conditions which make it possible to quickly remove the water from the reaction system. These conditions are a low process pressure, a large heating surface and a large temperature difference between the heating medium and the product medium, i.e., a high rate of evaporation at low temperature. Under these conditions, due to the rapid increase of the concentration of the monomers in the reaction solution, it is possible to start early the precondensation and to achieve a high degree of reaction, while still maintaining the reaction mixture in a low-viscosity fluid state. The critical process phase during which free diamine could escape is short. In addition, a high degree of conversion and consequently a low concentration of free hexamethylene diamine, which is chemically bound in the molecule chains, is already reached at a temperature of 190° C., above which the formation of dihexamethylene triamine is intensified. Therefore, the triamine content is minimized and amounts to a value below the limit of detection (100 ppm), in comparison with at least 300 ppm, based on polyamide-6,6, for commercial prior art products.

The reduced retention time compared to the state of the art makes possible a definite reduction of the process pressure and thus a reduction in the cost of the equipment without significant increase in diamine losses. The diamine losses are directly proportional to the retention time and inversely proportional to the process pressure. The theoretically higher diamine losses at low process pressure are offset by the reduced retention time. The heating and evaporation rates in accordance with the invention make it possible to keep the reaction mixture in discontinuously operated autoclaves in a fluid molten state without having to set the process pressure at a minimum of 16 bar, as previously assumed. The addition of usual chain regulators is possible.

SPECIFIC EXAMPLES

EXAMPLE 1

A stirred 200 l autoclave-reactor with an external heating jacket and an internal heating coil through which Diphyl (eutectic mixture of biphenyl and diphenyl ether), a heat transfer medium from Bayer AG, was circulated, but without dephlegmator or rectification column, was flushed with nitrogen until oxygen-free (<3 ppm $O_2$) and preheated with Diphyl at 275° C. Then 100 kg of an 80% aqueous solution of adipic acid hexamethylene diamine salt, preheated to 175° C., were introduced into the reactor, while the Diphyl temperature was raised to 320° C. Within 18 minutes the reaction solution was heated to 200° C. (heating rate 1.4° C./minute and an autogenous pressure of 8 bar. As soon as the reaction pressure reached 8 bar, 20 l of water were evaporated within 30 minutes (evaporation rate 3.3%/minute). The precondensation phase including heating above 175° C. was ended after a total of 68 minutes, at which time the product temperature had risen to 255° C. Then within 45 minutes, the reactor pressure was reduced to atmospheric pressure and simultaneously the reaction product was heated to 280° C. After seven more minutes at 280° C., the polyamide-6,6 had a relative viscosity of 2.59 dl/g and was pressed out of the reactor by a 6 bar nitrogen pressure and was granulated under water. A total of 120 minutes lapsed from the point at which heating above 175° C. began. The product had a very light color and a triamine content of less than 100 ppm (limit of detection), based on polyamide. The hexamethylene diamine content of the evaporated water was 0.59% by weight.

This polyamide-6,6 was spun at 4500 m/min. to filaments with a titer of 53 dtex, whereby no breaks occurred over 16 hours. At 40 to 41 cN/tex, the tenacity of the filaments was at the level of leading brand products.

EXAMPLE 2

The method of example 1 was repeated with the following differences:

The heating of the solution from 175° C. to 200° C. took 16 minutes at a heating rate of 1.5° C./minute. The evaporation of the water took 28 minutes at an evaporation rate of 3.6%/minute. The depressurization phase began after a total of 64 minutes, at a temperature of 253° C., and was completed at 1 bar pressure after 30 minutes. After 25 more minutes and the reduction of the pressure to 0.6 bar, or after a total of 119 minutes, the relative viscosity of the resulting polyamide-6,6 was 3.2 dl/g with a triamine content of less than 100 ppm (limit of detection). The hexamethylene diamine content of the water was 0.56% by weight. The tenacity of the filaments obtained through spinning was 45 to 50 cN/tex. Filament breaks did not occur during the 16 hour spinning process.

COMPARATIVE EXAMPLE

An 80% aqueous AH salt solution was heated in the same reactor as in the previous examples until a pressure of 18 bar was reached, then precondensed at a pressure of 18 bar and subsequently, with gradual release of the pressure to atmospheric, polycondensed to a relative viscosity of the polyamide of 2.55 dl/g. The retention time for heating from 175° C. and for precondensation was 110 minutes. The polycondensation required an additional 120 minutes. The triamine content of the polyamide was 320 ppm; the hexamethylene diamine content of the evaporated water was 0.50% by weight.

We claim:

1. A discontinuous process for the production of polyamide-6,6 with a relative viscosity of at least 2.2 dl/g, measured at 25° C. in a 1% polyamide solution in 96% sulfuric acid, comprising, heating a 75% to 85% aqueous solution of adipic acid hexamethylene diamine salt (AH-salt) from 175° C. to a temperature above 175° C. at a rate of at least 1° C./minute to autogenously attain precondensation pressure, precondensing the AH-salt solution at a pressure in the range of 6 to 9 bar, as the temperature rises to 255° C. maximum, and simultaneously evaporating water from the solution at a rate of at least 2%/minute based on the quantity of water in the AH salt solution, and polycondensing the precondensed product at a temperature between 260° and 290° C. while gradually reducing the pressure to 1 bar less, the total retention time for heating from 175° C. and for precondensing being not more than 75 minutes and the total retention time for heating from 175° C., precondensing and polycondensing being not more than 120 minutes.

2. The process of claim 1 in which the rate of evaporation is at least 3%/minute.

3. The process of claim 1 or 2 in which the precondensation pressure is approximately 8 bar.

* * * * *

UNITED STATES PATENT AND TRADEMARK OFFICE
CERTIFICATE OF CORRECTION

PATENT NO. : 5,306,804
DATED : April 26, 1994
INVENTOR(S) : Hartmut Liehr and Hans-Dieter Hofmann It is certified that error appears in the above-indentified patent and that said Letters Patent is hereby corrected as shown below:

Column 4, line 51, delete "dl/g" in the following occurrences: column 2, line 59; column 4, line 2; column 4, line 29; column 4, line 42; column 4, line 51.

Signed and Sealed this

Fourth Day of April, 1995

Attest:

BRUCE LEHMAN

Attesting Officer      Commissioner of Patents and Trademarks